(12) United States Patent
Kissel

(10) Patent No.: US 7,836,568 B2
(45) Date of Patent: Nov. 23, 2010

(54) TUBING DISCONNECT TOOL AND A METHOD FOR DISCONNECTING TUBING

(76) Inventor: Craig Kissel, 100 Penn St., Washington, MO (US) 63090

( * ) Notice: Subject to any disclaimer, the term of this patent is extended or adjusted under 35 U.S.C. 154(b) by 767 days.

(21) Appl. No.: 11/611,601

(22) Filed: Dec. 15, 2006

(65) Prior Publication Data

US 2007/0145741 A1 Jun. 28, 2007

Related U.S. Application Data

(60) Provisional application No. 60/750,686, filed on Dec. 15, 2005.

(51) Int. Cl.
*B23P 11/00* (2006.01)
(52) U.S. Cl. .......................... 29/243.5; 29/270; 254/25; 254/26 R
(58) Field of Classification Search ................ 29/243.5, 29/270–278; 254/25, 26 R
See application file for complete search history.

(56) References Cited

U.S. PATENT DOCUMENTS

| | | | | | |
|---|---|---|---|---|---|
| 960,193 | A | * | 5/1910 | Peterson | 7/165 |
| 5,267,383 | A | * | 12/1993 | Sawdon | 29/243.5 |
| 5,490,310 | A | * | 2/1996 | Schleicher | 29/243.5 |
| 5,495,651 | A | * | 3/1996 | Tsuha | 29/235 |
| 5,695,172 | A | * | 12/1997 | Hreha | 254/25 |
| 5,875,535 | A | * | 3/1999 | Canoy | 29/275 |
| 6,409,152 | B1 | * | 6/2002 | Bagley | 254/18 |
| 6,886,229 | B1 | * | 5/2005 | Wilson | 29/267 |
| 6,913,246 | B1 | * | 7/2005 | Skach | 254/25 |
| 2007/0145741 | A1 | * | 6/2007 | Kissel | 285/308 |

* cited by examiner

*Primary Examiner*—Lee D Wilson
(74) *Attorney, Agent, or Firm*—Polster Lieder Woodruff Lucchesi, L.C.

(57) ABSTRACT

A disconnect tool for disconnecting a tubing end from a fitting. The disconnect tool comprises a first member having a first front portion, a first rear portion, a first middle portion and a first channel disposed through the first front portion, the first rear portion and the first middle portion. The disconnect tool further comprises a second member having a second front portion, a second rear portion, a second middle portion and a second channel disposed through the second front portion, the second rear portion and the second middle portion. The second channel aligns with the first channel wherein second middle portion contacts an outer collet surface of the collet such that the second middle portion forces the outer collet surface against a forward end of the fitting to axially drive the collet inwardly against the fitting in order to release the tubing end from the collet.

4 Claims, 4 Drawing Sheets

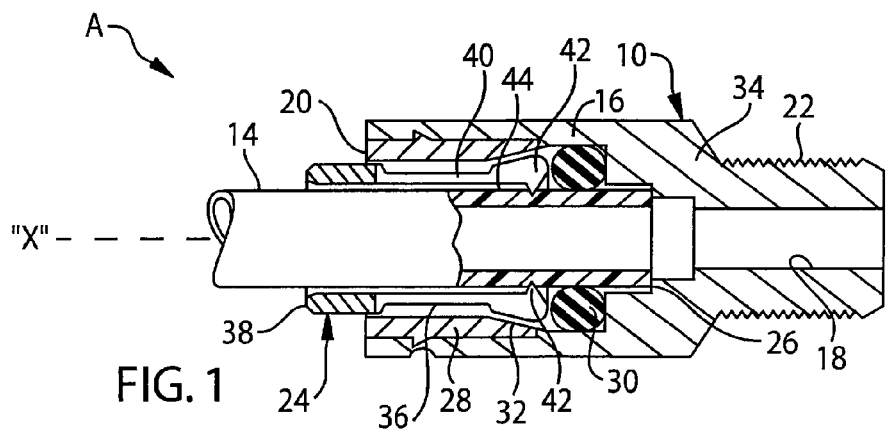
FIG. 1
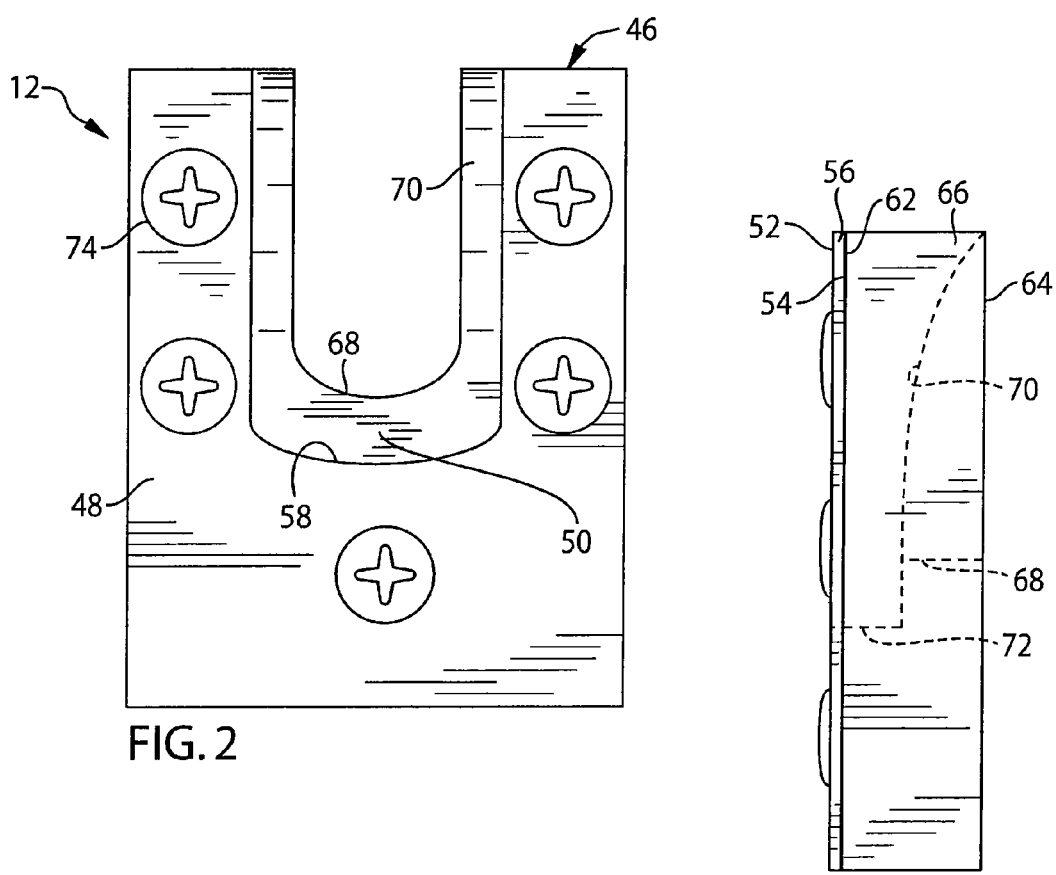
FIG. 2
FIG. 3
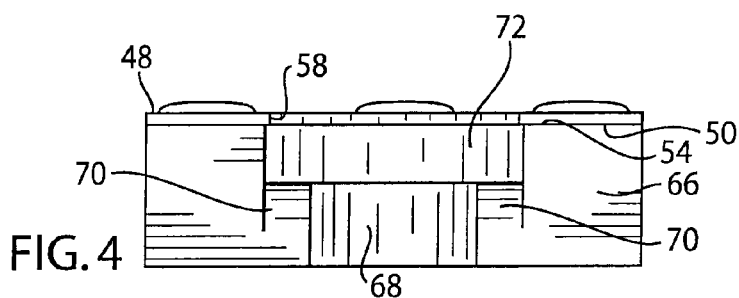
FIG. 4

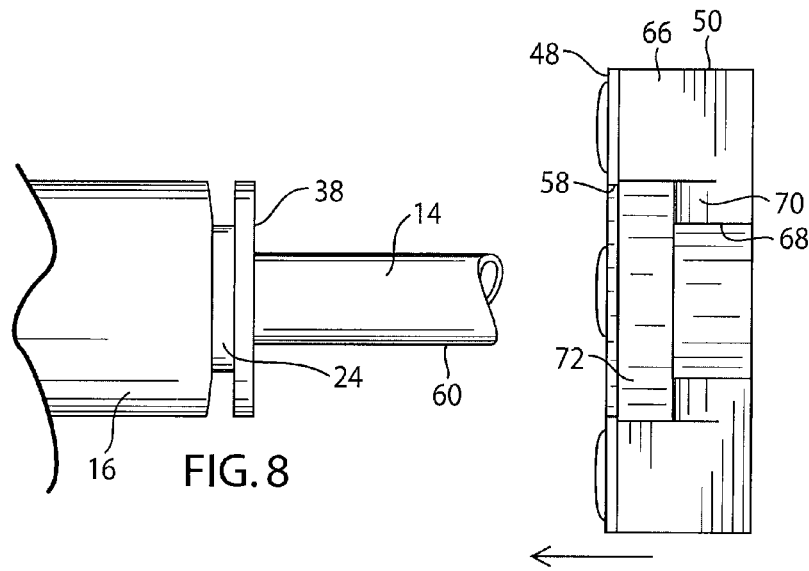
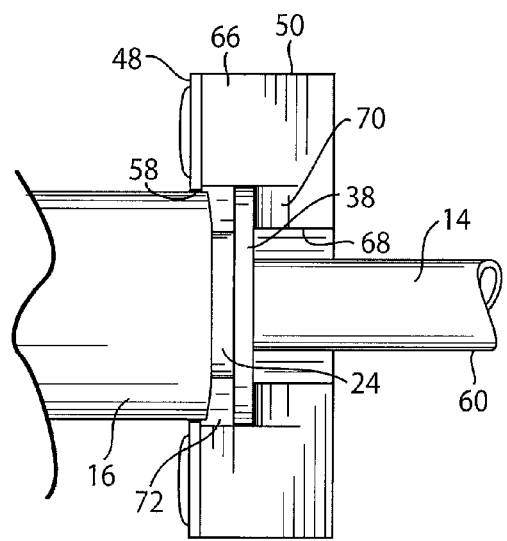
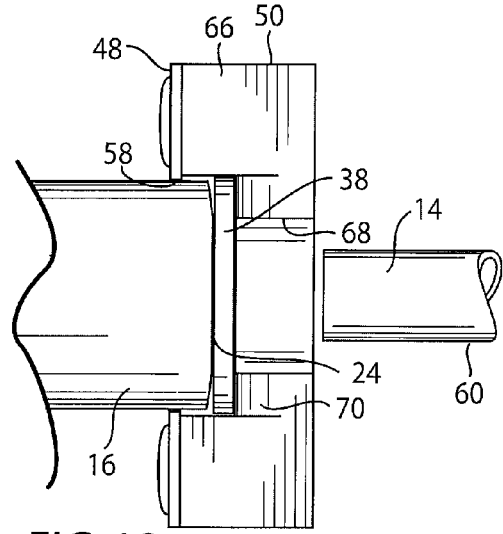

TUBING DISCONNECT TOOL AND A METHOD FOR DISCONNECTING TUBING

CROSS-REFERENCE TO RELATED APPLICATIONS

This application claims priority under 35 U.S.C. §119(e) of U.S. Provisional Patent Application No. 60/750,686 filed Dec. 15, 2005, in the name of the present inventor and entitled "Tubing Disconnect Tool And Method For Disconnecting Tubing".

STATEMENT REGARDING FEDERALLY SPONSORED RESEARCH

Not Applicable.

BACKGROUND OF THE DISCLOSURE

This disclosure relates to generally to the field of specialty tools, and in particular, to a hand tool designed for disconnecting a tubing end from an associated fitting.

In the field of fluid fittings used in pneumatic and hydraulic systems, it is commonplace to employ rapid connect and disconnect fittings designed for use with nylon and other semi-rigid plastic tubing. One well-known example of such fittings is an "instant fitting".

Instant fittings of a manual "push-in" or "push-to-connect" variety are widely employed in a variety of pneumatic, hydraulic, and other fluid applications utilizing plastic tubing. For example, metal or polymeric fittings of such type are used as tubing connections for automotive, marine, industrial and machinery applications.

Such instant fittings customarily comprise a slotted collet received within a body of the fitting, wherein the body has a tapered shoulder cooperative with slope surfaces of the body such that one end of a semi-rigid plastic tubing is insertable through the collet and into the body. When the tubing is pulled in a withdrawal direction, or when the system is pressurized, the tubing draws the collet along the slope surfaces, causing a gripping ridge of the collet to grasp the tubing tighter, securing it firmly in the fitting.

To disengage the tubing from the instant fitting, it is customary to push the protruding end of the collet inwardly into the fitting body to expand the collet and to disengage the plastic tubing from the slope surfaces of the body. The typical disconnect procedure is to push the protruding end of the collet with a tool such as a wrench, or pliers. However, this disconnect procedure can be difficult and potentially injurious to service personnel since the tubing/fitting connection is typically positioned in a hard to reach and/or confined area. As such, manipulating the tool in such an area results in injured fingers, hand or forearms due to slippage of the tool. The procedure is also clumsy and the tool can damage/puncture the tubing during the disconnect procedure. Indeed, some fittings exist in locations so confined that one cannot gain access to them with tools.

The foregoing as well as presently preferred embodiments of the present disclosure will become more apparent from the reading of the following description in connection with the accompanying drawings.

SUMMARY

The present disclosure relates to a disconnect tool that enables a one-handed disconnection of tubing from a fitting, wherein a tubing end inserts within a collet of the fitting.

The disconnect tool comprises a first member having a first front portion, a first rear portion, a first middle portion and a first channel disposed through the first front portion, the first rear portion and the first middle portion. The disconnect tool further comprises a second member having a second front portion, a second rear portion, a second middle portion and a second channel disposed through the second front portion, the second rear portion and the second middle portion.

The second channel aligns with the first channel wherein the first and second channels are sized and shaped to accent an outer diameter of the tubing end. The second middle portion contacts an outer collet surface of the collet such that the second middle portion forces the outer collet surface against the forward end of the fitting to axially drive the collet inwardly against the fitting in order to release the tubing end from the collet.

During use, the operator moves the disconnect tool in contact with the fitting and positions the tubing end within the first channel and the second channel. The operator then moves the second member against the outer collet surface of the collet, which axially drives the outer collet surface against the fitting to release the tubing end from the collet.

BRIEF DESCRIPTION OF THE SEVERAL VIEWS OF THE DRAWINGS

In the accompanying drawings which form part of the specification:

FIG. 1 is a cross sectional view illustrating a tubing end inserted within a collet of an instant fitting wherein the collet includes a collet contact surface;

FIG. 2 is a front view of a disconnect tool constructed in accordance with and embodying the present disclosure illustrating a first member, second member and associated channels of the disconnect tool of FIG. 1;

FIG. 3 is a side view of the disconnect tool of FIG. 2 illustrating in phantom lines a pair of bevel surfaces of the second member;

FIG. 4 is a top view of the disconnect tool of FIG. 2;

FIG. 8 is a plan view of FIG. 5 illustrating the disconnect tool approaching the collet;

FIG. 9 is a plan view of FIG. 6 illustrating the disconnect tool contacting the collet;

FIG. 10 is a plan view of FIG. 7 illustrating the disconnect tool moving the collet and further illustrating the tubing released from the fitting.

Corresponding reference characters indicate corresponding parts throughout the several views of the drawings.

DESCRIPTION OF THE PREFERRED EMBODIMENT

Figure 5:
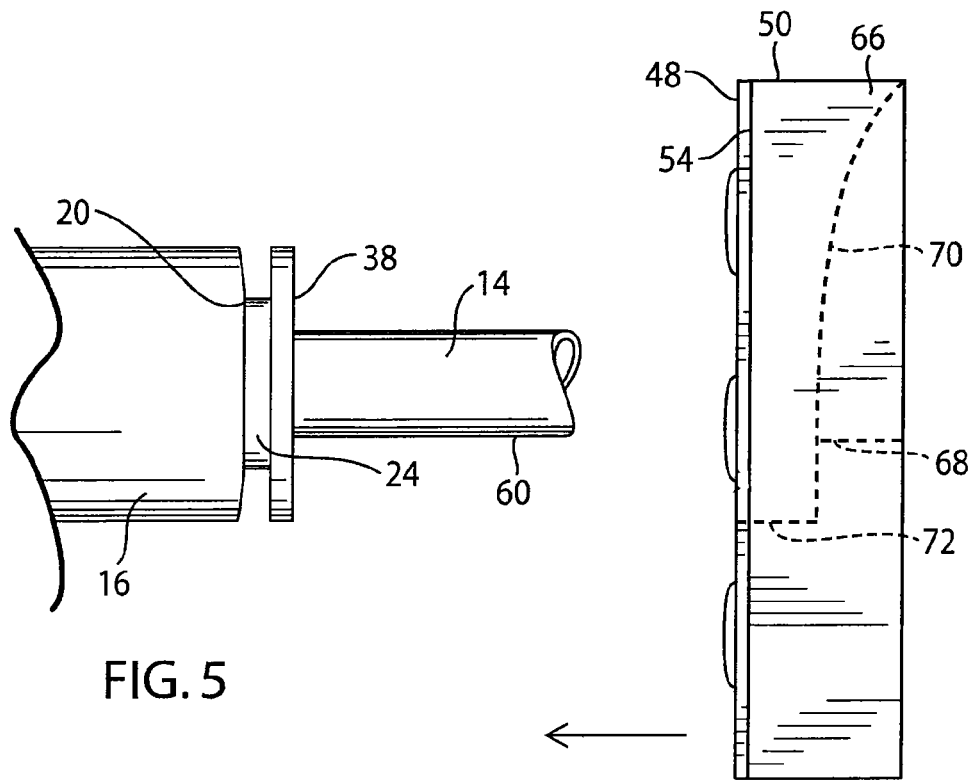
FIG. 5 is a cross sectional view of the disconnect tool separated from the tubing/fitting connection illustrating the tubing end locked within the fitting.

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The present invention relates to a fitting assembly that enables a one-handed disconnection of tubing from fittings in a rapid, reliable, economical and safe manner. The disclosure herein is described in connection with a "push-in" instant fitting assembly particularly adapted for hydraulic and pneumatic applications utilizing plastic tubing. It will be appreciated, however, that aspects of the present disclosure may find utility in any conduit system, whether for gases, solids or liquids, which utilize any sized tubing of any material. The present disclosure incorporates by reference pending application having U.S. Ser. No. 11/262,569.

Referring to the drawings, in combination with a push-in instant fitting 10 (FIG. 1), the present disclosure comprises a disconnect tool 12 (FIG. 2). The fitting 10 according to the present disclosure is adapted for a releasable fluid connection with a distal end of a length of tubing end 14 having a wall of given outer diameter. Fitting 10 may be configured as a coupling, connector, union, adapter, tee, elbow, or cap. Furthermore, it may be embodied in a component of a machine, such as a valve.

As shown in FIG. 1, the fitting 10 includes a generally annular body 16, a bore 18, a forward end 20, a rear end 22 and a collet 24. Typically, the body 16 extends axially along a central longitudinal axis "X" of fitting 10 from the open forward end 20 to the rear end 22. The body 16 positions the bore 18 along the central longitudinal axis to extend between the open forward end 20 and the rear end 22.

In one embodiment (not shown), the body further includes an engagement surface positioned adjacent the forward end. In this embodiment, the engagement surface lies along an annular groove positioned around the body. The engagement surface may face axially rearwardly toward the rear end. Alternatively, the engagement surface lies along a flange (not shown), which connects with the body. The flange may be removably attached to the body or may be fixed to the body. In another embodiment, the engagement surface lies along slots (not shown) positioned along sides of the body.

The bore 18 leads up to an interior shoulder 28 and contains a collar 28 and an annular seal 30. The interior shoulder 28 is positioned between the forward end 20 and the rear end 22 while the collar 28 is positioned between the interior shoulder 28 and the forward end 20. The collar 28 includes slope surfaces 32 that contact the collet 24 as will be discussed.

For illustrative purposes, rear end 22 is shown to be configured as a nipple having external threads for coupling with a corresponding fastening member such as a female threaded end of an associated fitting (not shown). In this regard, a radial flange 34 configured as having hexagonal flat portions may be integrally formed about body 16 member intermediate the forward and rear ends 22, 24 thereof for engagement with a wrench or other tool during installation or connection. Other externally-threaded, as well as internally-threaded or unthreaded, embodiments of rear end 22 may be envisioned, however, depending on the desired configuration of fitting 10 as the connector, union, adapter, tee, elbow, cap, or the like.

The collet 24 comprises a generally tubular one-piece member 36 and an outer collet surface 38 in the form of a push ring. FIG. 1 illustrates an exemplary configuration of the collet 24. Collet 24 may comprise other configurations. As known, collet 24 comprises a means for holding tubing end 14 within the fitting 10 and a means for releasing the tubing end 14 from the fitting 10. Collet 24 includes components that are external and internally positioned within the fitting 10.

The outer collet surface 38 faces axially away from the end 22, and as such is presented in the axial direction opposite to that in which the body 16 is presented. The tubing end 16 coaxially inserts within the forward end 20 and the bore 18 while the outer collet surface 38 extends out of the bore 18 in a position adjacent to the forward end 20 of the body 16. The collet 24 is integrally formed as having a generally cylindrical wall portion 40 of a given diameter which is resiliently expandable against the slope surfaces 32 of the collar 28 to receive the distal end of tubing end 14 therethrough. The wall portion 40 extends axially along central longitudinal axis of the bore 18 between the forward end 20 and the rear end 22. The collet 24 can move axially of fitting 10 between the seal 30 and the slope surfaces 32 of the collar 28 by reason of axially directed slots.

The wall portion 40 includes fingers 42 that position against the slope surfaces 32 of the collar 28. The wall portion 40 positions against an outer wall 44 of the tubing end 14 affecting the radially outward expansion of the wall portion 40 allowing for the insertion of the distal tubing end 14 pushed through the collet 24 from the open forward end 20 of the body 16. The seal 30 is interposed between the rear end 22 of the collet 24 and a forwardly presenting end wall of the bore 18 for effecting a fluid-tight engagement with the outer wall 44 of the tubing end 14 and an inner wall of the bore 18.

The disconnect tool 12 (FIGS. 2-11) comprises a member generally shown as 46 wherein the disconnect tool 12 can be operated by one hand. As will be discussed, the member 46 contacts the outer collet surface 38 to force the out collet surface 38 against the forward end of the body 16 to axially drive the wall portion 40 against the bore 18 to release the tubing end 14 from the collet 24. In one embodiment, the member 46 comprises a first member 48 and a second member 50. The first member 48 may have a first front portion 52, a first rear portion 54 and a first middle portion 56. The first member 48 further has a first channel 58 disposed within the first front portion 52, the first rear portion 54 the middle portion 58. The first channel 58 is sized and shaped to accept an outer diameter 60 of the tubing end 14 (FIG. 5). In one embodiment, the first channel 58 is U-shaped.

The second member 50 may have a second front portion 62, a second rear portion 64 and a second middle portion 66. The second member 50 further has a second channel 68 disposed within the second front portion 62, the second rear portion 64 and second middle portion 66. The second channel 68 is sized and shaped to accept an outer diameter 60 of the tubing end 14 (FIG. 5). In one embodiment, the second channel 68 is U-shaped. Additionally, the first channel 58 and the second channel 68 may be axially aligned to each other at a fixed distance. The first channel 58 may be wider than the second channel 68 while the second channel 68 may be longer than the first channel 58.

The second middle portion 66 has a pair of bevel surfaces 70 (FIGS. 2-4). The bevel surfaces 70 bevel outwardly and downwardly from the second middle portion 66 toward the first rear portion. As shown, the second channel 68 separates the pair of bevel surfaces 70. The bevel surfaces 70 begin near a top portion of the second middle portion 66 and end near the bottom portion of the second middle portion 66. In particular, the bevel surfaces 70 end at a seat 72 of the second member. As shown in FIG. 3, the seat 72 separates the first channel and the second channel 68.

Figure 11:
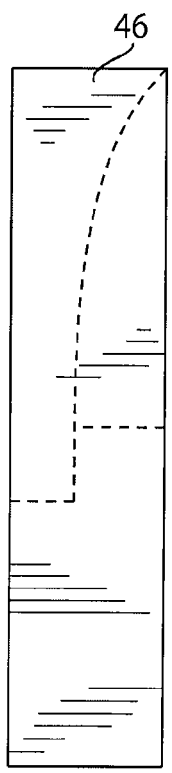
FIG. 11 is a side view of another embodiment of the disconnect tool constructed in accordance with and embodying the present disclosure.

The first member 48 and the second member 50 may comprise different materials such as metal and plastic respectively. In an embodiment, the first member 48 and second member 50 may comprise the same material such as plastic. Further, as shown, a fastener 74 may fasten the first member 48 and the second member 50 together. The fastener 74 may include but is not limited to a screw, a seal or a weld. Still further, as shown in FIG. 11, the member 46 may comprise a unitary member comprising a material such as plastic.

Referring to FIG. 1, for assembly, as the tubing end 14 is inserted into the fitting 10, the distal end of the tubing end 14 first is passed through grip edges of the wall portion 40 of the collet 24, segments of which expand to resiliently capture and hold the outer wall 44 of the tubing 16, and then through the seal 30 which provides a leak-proof seal 30 against the outer wall 44 of the tubing end 14. The advancement of the tubing end 14 into the open forward end 20 of the fitting 10 is continued until positively stopped by the interior shoulder 28 of the bore 18.

Upon the pressurization of the tubing end 14, or as the tubing end 14 is pulled or otherwise placed in tension by a generally forwardly directed force, the collet 24 is moved forwardly within the tubing end 14. This movement is delimited, however, by shoulders of the wall portion 40 being made to abuttingly contact the slope surfaces 32 of the body 16 in a force transmitting engagement by applying a radially-inwardly directed force to the collet 24 segments and the grip edges thereof. Once the semi-rigid plastic tubing end 14 is insertable into fitting 10 to make the sealed connection with the bore 18, the collet 24 flexes radially outwardly to allow grip edges to expand during such tubing insertion. In this way, the grip of the collet 24 is thereby tightened about the outer wall 44 of the tubing end 14 preventing the removal of the tubing end 14 from the fitting 10.

For disassembly, the tubing end 14 may be released from the fitting 10 by pushing the collet 24 further into the body 16 and bottoming the tubing end 14 against the interior shoulder 28 to effect the repositioning of the collet 24 within the bore 18. In such position, the collet 24 segments again may be expanded to release the tubing end 14. In this regard, the outer collet surface 38 may be configured as an annular ring that may be pushed axially inwardly for advancing the collet 24 and tubing end 14 within the body 16.

As indicated previously, hitherto in order to disconnect the tubing end 14 from fitting 10, the procedure used is to grip the tubing end 14 with one hand and, by means of a wrench or other tool grasped in the other hand, to push the collet 24 to displace it from the slope surfaces 32, thereby allowing the tubing end 14 to be drawn out of the fitting 10.

Turning to FIGS. 5-10 and referring to FIG. 1, in accordance with the present disclosure, the one-handed disconnect tool 12 now enables a much more rapid and one-handed disconnection of the tubing end 14 from fitting 10, by operation of the disconnect tool 12. To withdraw the tube from the fitting 10, the collet 24 must retract slightly into the fitting body 16 to the extent that the fingers 42 with the collet 24 expand outwardly away from the tubing end 16 and thus release the grip on the tubing end 16.

During operation, the operator positions the tool 12 near the fitting 10 with the channels 58, 68 aligned with the tubing end 14. Due to the configuration of the tool 12, the operator can easily grasp and manipulate the tool 12 by a few fingers of one hand. With the tool 12 so positioned, it is advanced axially toward the fitting 10 (FIGS. 5 and 8). The operator easily slides the tool 12 so that the first channel 58 and second channel 68 accept the outer diameter 60 of a portion of the tubing end 14 that extends beyond the collet 24. In this position, the first channel 58 may partially surround a portion of the body 16 of the fitting 10. Additionally, the tubing end 14 extends through the first channel 58 and beyond the second channel 68. Additionally, in this position, the bottom of the outer collet surface 38 may rest upon the top of the seat 72 (FIG. 6).

Figure 6:
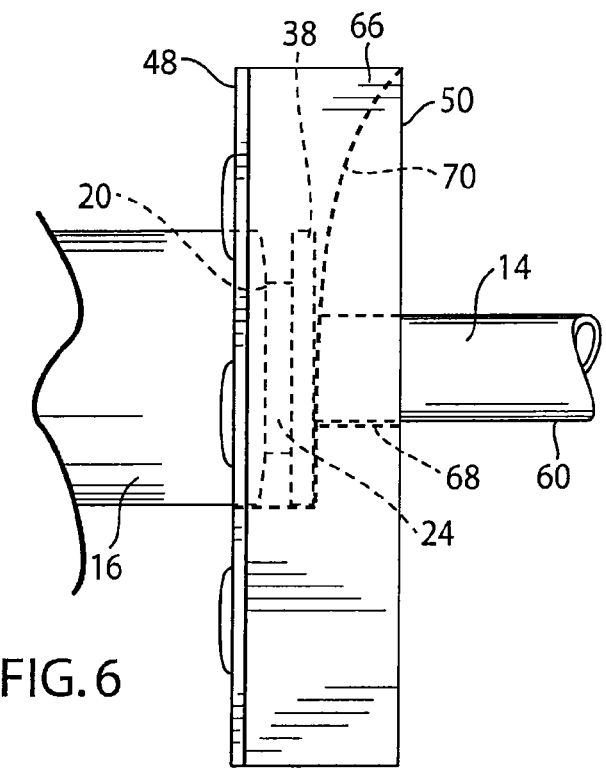
FIG. 6 is a cross sectional view illustrating the disconnect tool partially surrounding the tubing and contacting the collet.
Figure 7:
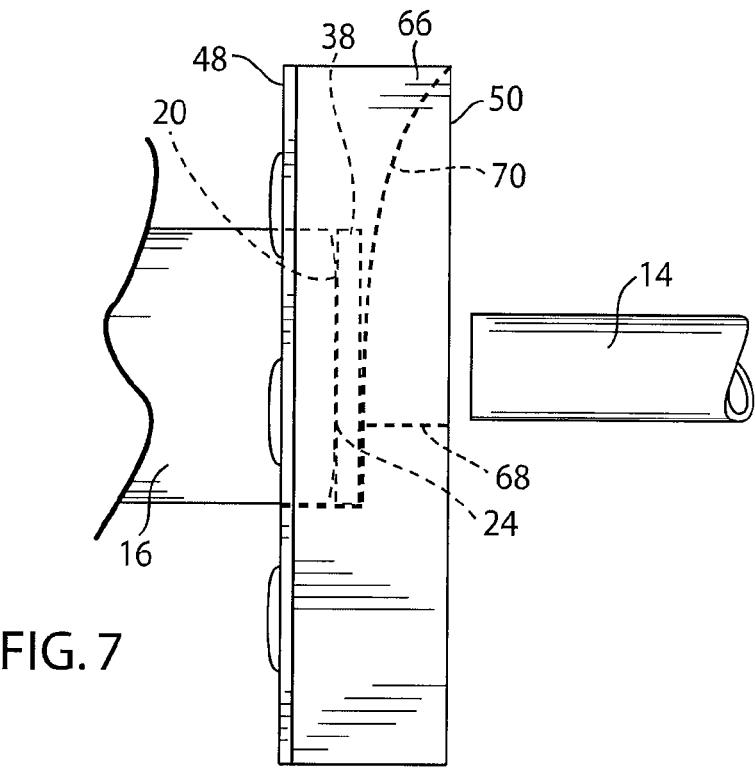
FIG. 7 is a cross sectional view illustrating the disconnect tool moving the collet and further illustrating the tubing released from the fitting.

The operator then moves the second member 52 in contact with the outer collet surface 38 wherein the second member 52 axially drives the outer collet surface 38 to release the tubing end 14 (FIGS. 6 and 8). In moving the second member 52 against the outer collet surface 38, the pair of bevel surfaces 70 contact the outer collet surface 38. As the tool 12 continues to advance, the bevel surfaces 70 function as a cam and force the collet 24 farther into the body 16 (FIGS. 7 and 10). In particular, the bevel surfaces 70 forces the outer collet surface 38 against the forward end of the body 16 to axially drive the wall portion 40 of the collet 24 inwardly against the slope surfaces 32 of the bore 18 so that the fingers 42 release the tubing end 14 from the collet 24.

When the tool 12 is advanced to its fullest extent, it retains the collet 24 in its retracted position, and the tubing end 16 may be easily withdrawn from the fitting 10. Once the collet 24 releases the tubing end 14, the operator easily pulls the disconnect tool 12 away from the fitting 10.

As previously noted, the body may include an engagement surface such as a groove. In this embodiment, the first member may engage the groove as the operator moves the tool. Engaging the first member with the groove resists movement of the second member such that the engaged first member provides a fixed resistance position for the disconnect tool.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A disconnect tool for one-handed disconnection of a tubing end which is inserted with a collet of a fitting, the disconnect tool comprising:
   a first member having a first front portion, a first rear portion, a first middle portion and a first channel disposed through the first front portion, the first rear portion and the first middle portion; and
   a second member having a second front portion, a second rear portion, and a second middle portion, the second middle portion having a pair of bevel surfaces that are positioned separate and spaced from the first member, the surfaces are configured to bevel outwardly and downwardly from the second middle portion toward the first portion, the second member further having a second channel disposed through the second front portion, the second rear portion and the second middle portion, the second channel being axially aligned with the first channel wherein the pair of bevel surfaces contact an outer collet surface of the collet such that the pair of bevel surfaces cam the outer collet surface against the fitting to axially drive the collet inwardly against the fitting in order to release the tubing end from the collet.

2. The disconnect tool of claim 1 further comprising a seat positioned between the first rear portion and the second front portion.

3. The disconnect tool of claim 2 wherein the pair of bevel surfaces begin at the second rear portion and terminate at the seat and wherein the second channel separates the pair of bevel surfaces.

4. The disconnect tool of claim 1 wherein the first channel and the second channel are sized and shaped to accept an outer diameter of the tubing end.

* * * * *